Sept. 13, 1927.  
A. Y. DODGE  
1,642,063  
BRAKING AND STEERING MECHANISM  
Filed May 7, 1925  
2 Sheets-Sheet

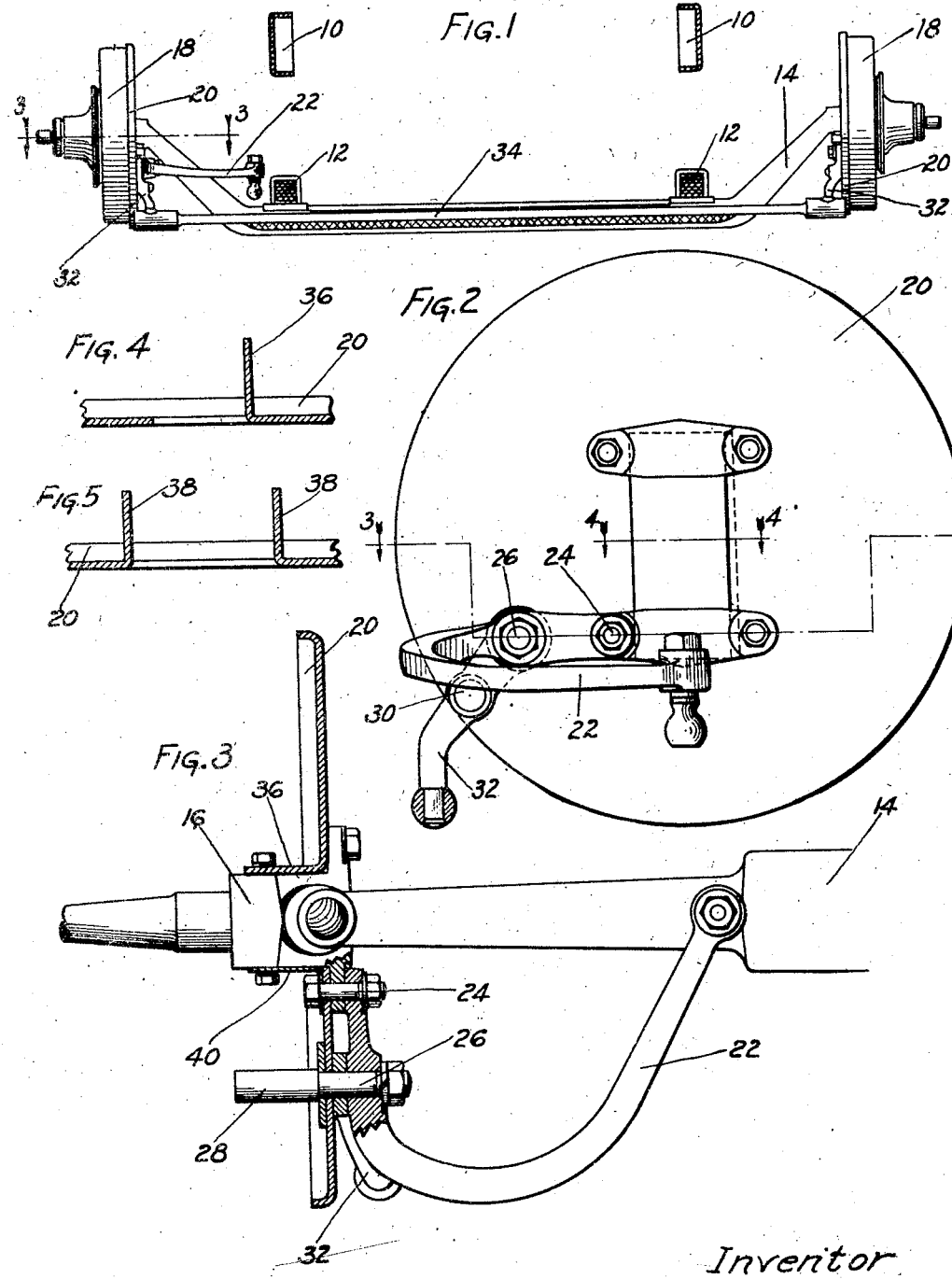

INVENTOR  
ADIEL Y. DODGE  
BY  
ATTORNEY

Patented Sept. 13, 1927.

1,642,063

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKING AND STEERING MECHANISM.

Application filed May 7, 1925. Serial No. 28,589.

This invention relates to vehicles and is illustrated as embodied in the front axle assembly of an automobile chassis. An object of the invention is to simplify the braking and steering connections by utilizing parts of the braking mechanism as parts of the steering connections.

Having this object in view, the invention contemplates mounting the usual steering arm by bolting it to the backing plate of the brake, thus avoiding the necessity of providing special means on the knuckle for mounting the steering arm. Preferably, also, the two tie-rod arms for the steering knuckles are secured to the backing plate, and in one desirable arrangement the steering arm is connected to the backing plate on its knuckle by the same means which secures the corresponding tie-rod arm. As a further simplification, I prefer to secure the steering arm in such a manner as to reinforce the backing plate by securing it at the outer margin of the plate, and by fastening it at its inner end by one of the bolts or other fasteners which secure the backing plate to the knuckle. I may, if desired, secure it to the backing plate by a fastening member which also serves as an anchor for one or more of the brake shoes. Preferably this last fastening is also utilized in mounting the tie-rod arm on the backing plate.

Another feature of the invention relates to stamping the backing plate from sheet metal in such a manner as to provide axially extending flanges embracing and secured to a part of the knuckle.

Other objects and features of the invention, including various novel combinations of parts and desirable particular constructions, will be apparent from the following description of one illustrative embodiment shown in the accompanying drawings, in which:

Figure 1 is a vertical section through an automobile chassis just behind the front axle and showing the above described connections in rear elevation;

Figure 2 is an elevation looking outwardly at the left-hand backing plate with its steering arm and tie-rod arm removed from the axle;

Figure 3 is a horizontal section substantially on the line 3—3 of Figure 2, showing the mounting of the steering arm;

Figure 4 is a section on the line 4—4 of Figure 2, showing one form of backing plate;

Figure 5 is a view corresponding to Figure 4 but showing a different form of backing plate.

Figure 6:
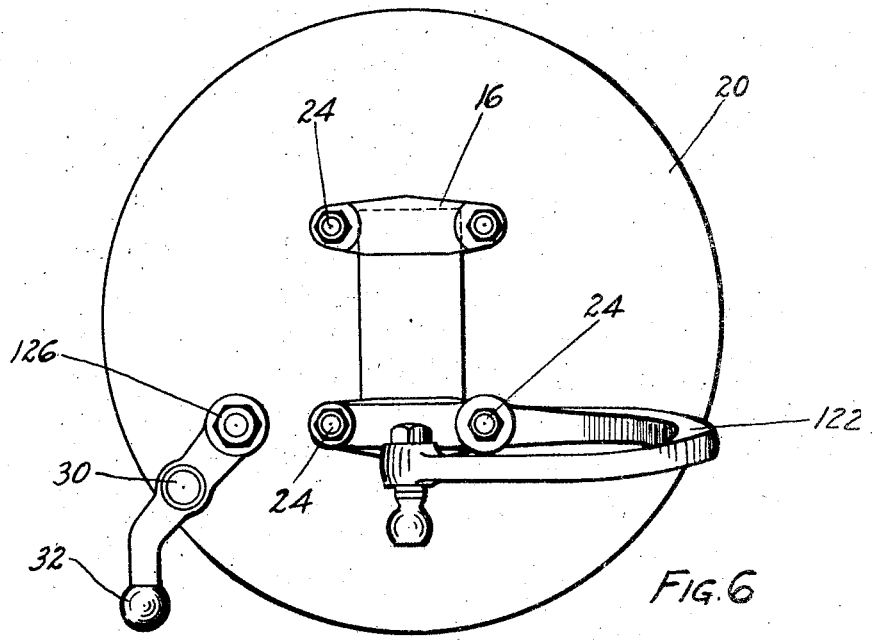
Figure 6 is a view corresponding to Figure 2, but showing a different mounting of the steering arm.

In the arrangement selected for illustration, the invention is embodied in a chassis including a frame 10 supported by the usual springs 12 on a rear axle (not shown), and on a front axle 14 having knuckles 16 swivelled at its opposite ends by the usual king pins. Each of the knuckles is shown as carrying a brake, including a drum 18 rotating with the wheel, and within which are arranged one or more brake shoes anchored on a novel stationary backing plate 20.

According to one feature of the invention, a steering arm 22 adapted to be connected to the usual steering mechanism, to be operated by the steering wheel, is fastened to the knuckle 16 and the backing plate 20 by one of the bolts or other fastenings 24 used to secure the backing plate 20 to a flange of the knuckle 16, and also by a fastening 26 extended through the backing plate to form an anchor 28 for one or more of the brake shoes.

Preferably the fastening 26, together with a separate fastener 30, also fastens to the backing plate one of the arms 32 pivotally connected as, for example, by a ball and socket joint of any desired type, with the usual cross tie-rod 34. Since there is no steering arm 22 on the right-hand side of the vehicle, the right-hand arm 32 is fastened to the backing plate 20 as shown, except that fastening 26 is shorter by the thickness of the steering arm. It will be seen that this provides a very inexpensive but strong assembly.

Preferably the backing plate 20 is stamped from heavy sheet metal and has a single flange 36 (Figure 4) or two flanges 38 (Figure 5) arranged to embrace the vertical part of the knuckle 16, as shown in Figure 3. The bending out of these flanges 36 or 38 also serves to form the necessary rectangular opening to fit over the vertical part of the knuckle 16. When the opening is only large enough to form the single flange 36, a separate stamping 40 may be provided on the opposite side as shown in Figure 3.

In the arrangement of Figure 6, the tie-rod arm 32 is held by its fastening 30, and by a fastening 126 serving also as a brake anchor, while the steering arm 122 curves forwardly instead of rearwardly, and is held by two of the fastenings 24 of the backing plate 20.

While illustrative embodiments of the invention have been described in detail, it is not my intention to limit its scope to those particular embodiments or otherwise than by the terms of the appended claims.

I claim:

1. A backing plate for a brake having a generally rectangular opening fitting over part of a knuckle and formed by bending out an integral flange at right angles to fit against the knuckle.

2. A backing plate for a brake having a generally rectangular opening fitting over part of a knuckle and formed by bending out a pair of integral flanges at right angles to embrace and fit against the knuckle.

3. In combination with a swivelled steering knuckle, a brake backing plate secured thereto, a steering arm attached to one point of the backing plate, and a brake anchor securing the steering arm to the backing plate at a point removed from the first mentioned point.

In testimony whereof I have hereunto signed my name.

ADIEL Y. DODGE.